(12) United States Patent
Carswell et al.

(10) Patent No.: US 7,905,554 B2
(45) Date of Patent: Mar. 15, 2011

(54) WORKING MACHINE

(75) Inventors: Ian Harrold Carswell, Derbyshire (GB); Harishchandra Manilal Narotham, Cheshire (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 1091 days.

(21) Appl. No.: 11/625,040

(22) Filed: Jan. 19, 2007

(65) Prior Publication Data

US 2007/0176483 A1 Aug. 2, 2007

(30) Foreign Application Priority Data

Jan. 20, 2006 (GB) .................................. 0601142.3

(51) Int. Cl.
*B60T 13/74* (2006.01)
*B60T 13/00* (2006.01)
(52) U.S. Cl. ................... 303/2; 303/13; 303/DIG. 12
(58) Field of Classification Search ............ 303/2, 9.61, 303/9.66, 11, 13, 15, 127, DIG. 12; 192/215, 192/221; 180/53.1, 370
See application file for complete search history.

(56) References Cited

U.S. PATENT DOCUMENTS

| | | | |
|---|---|---|---|
| 3,542,173 A | 11/1970 | Kratzenberg et al. | |
| 3,650,568 A | 3/1972 | Poplawski | |
| 3,939,937 A | 2/1976 | Moberg | |
| 3,966,008 A | 6/1976 | Klaue | |
| 4,068,899 A * | 1/1978 | Nolte et al. ................ | 303/9.61 |
| 4,428,621 A | 1/1984 | Taki et al. | |
| 6,099,090 A | 8/2000 | Paggi et al. | |
| 2007/0205660 A1 | 9/2007 | Carswell | |

FOREIGN PATENT DOCUMENTS

| | | |
|---|---|---|
| DE | 26 08 351 | 9/1977 |
| EP | 1 258 406 | 2/2003 |
| EP | 1 093 986 | 7/2003 |
| EP | 1 582 389 | 10/2005 |
| GB | 899 739 | 6/1962 |
| GB | 1 143 793 | 2/1969 |
| GB | 2 153 467 | 8/1985 |

OTHER PUBLICATIONS

European Search Report corresponding to European application No. EP 07 00 1156, completed on Apr. 5, 2007.
Search Report corresponding to Great Britain Application No. GB0701020.0, completed May 16, 2007.
Search Report corresponding to Great Britain Application No. GB0601146.4, completed May 19, 2006.

* cited by examiner

*Primary Examiner* — Melody M Burch
(74) *Attorney, Agent, or Firm* — Greenlee Sullivan PC

(57) ABSTRACT

A working machine includes a body, a ground engaging structure including at least one pair of driven wheels, an engine, and a transmission for transmitting power from the engine to the driven wheels, a pressurized air system for providing pressurized air for use in applying service brakes for braking the wheels, the transmission including a transmission member which is rotatable with the wheels, a transmission brake for applying a braking force to the transmission member, and the transmission brake being releasable by a hydraulic fluid operated transmission brake releasing device, the hydraulic fluid for the brake releasing device being derived from a pressurized hydraulic fluid system which includes a hydraulic pump and one or more pressurized fluid operated services, there being a transmission brake control valve to control the flow of hydraulic fluid to the brake releasing device, the transmission brake control valve being actuated to permit pressurized hydraulic fluid to flow therethrough to release the transmission brake, by air pressure, derived from the pressurized air system.

17 Claims, 2 Drawing Sheets

WORKING MACHINE

CROSS-REFERENCE TO RELATED APPLICATIONS

This application claims the benefit of United Kingdom Patent Application 0601142.3 filed Jan. 20, 2006, which is hereby incorporated by reference to the extent not inconsistent with the disclosure herewith.

BACKGROUND TO THE INVENTION

This invention relates to a working machine for performing work operations such as loading and excavating.

More particularly but not exclusively the invention relates to a working machine known as a "backhoe loader" which has a first working arm, usually at or towards a front of the machine, for performing loading operations, and a second working arm usually towards a rear of the machine, for performing excavating operations.

DESCRIPTION OF THE PRIOR ART

The wheels of such machines typically are each provided with a service braking device operated by a hydraulic fluid operated braking device of a braking system, the hydraulic fluid being pressurized by an air-hydraulic actuator. In such an arrangement, the flow of a supply of air provided under pressure, to the air-hydraulic actuator is under the control of an operator control, usually operating a foot pedal, to apply the brakes.

Such a machine typically has a parking brake too, which may be operative to apply a braking force to a transmission member to brake the machine when parked. The parking brake is usually spring applied, and released by a pressurized air device, the pressurized air being derived from the braking system. Thus the service brakes require air pressure for the brakes to be applied, but the parking brake needs air pressure to release the braking force. In this way, in the event of a failure of the air supply, at least the parking brake may be applied to effect machine braking.

In order to provide a substantial braking force to the transmission member, a substantial mechanical spring is required, and accordingly in order to release the brake, a substantial force is required to be developed by the pressurized air device. Thus physically the pressurized air device needs to be large which makes it difficult to accommodate the pressurized air parking brake releasing device conveniently on the machine.

SUMMARY OF THE INVENTION

According to one aspect of the invention we provide a working machine including a body, a ground engaging structure including at least one pair of driven wheels, an engine, and a transmission for transmitting power from the engine to the driven wheels, a pressurized air system for providing pressurized air for use in applying service brakes for braking the wheels, the transmission including a transmission member which is rotatable with the wheels, a transmission brake for applying a braking force to the transmission member, and the transmission brake being releasable by a hydraulic fluid operated transmission brake releasing device, the hydraulic fluid for the brake releasing device being derived from a pressurized hydraulic fluid system which includes a hydraulic pump and one or more pressurized hydraulic fluid operated services, there being a transmission brake control valve to control the flow of hydraulic fluid to the brake releasing device, the transmission brake control valve being actuated to permit pressurized hydraulic fluid to flow therethrough to release the transmission brake, by air pressure derived from the air pressure system.

By providing a transmission brake releasing device which is hydraulic fluid operated, the physical size of the device can be minimized because a hydraulic fluid pressure operated device is able to develop more force to release the brake than an air operated transmission brake release device of the same size.

The invention has particularly but not exclusively been developed for a machine in which the service brakes include for each driven wheel, a braking device for applying braking to the wheel, each braking device being operated to apply the brake by hydraulic fluid pressurized by an air-hydraulic actuator which is separate from the pressurized hydraulic fluid system from which pressurized hydraulic fluid is derived for the transmission brake releasing device.

Thus a supply of pressurized air for applying to the transmission brake control valve to control the flow of hydraulic fluid to the brake releasing device, is readily available from the pressurized air system which includes the air-hydraulic actuator.

The machine may include a plurality of pressurized hydraulic fluid actuated services, the pressurized hydraulic fluid being provided by one or more pumps, the pressurized hydraulic fluid for the transmission brake releasing device being derived from a hydraulic system of the machine which includes the or a pump and one or more of the services.

The machine may be of the kind having a working arm for performing a working operation, the working arm being powered by at least one hydraulic actuator, and the hydraulic fluid for the transmission brake releasing device may be derived from the pressurized hydraulic fluid supply available for operating the hydraulic actuator.

The working arm or arms may be operated by one or more hydraulic actuators of a hydraulic system, the hydraulic system being provided with pressurized hydraulic fluid by a system pump which may be driven directly from the engine.

The machine may include a hydraulically operated or assisted steering mechanism and/or one or more hydraulic actuators of the machine transmission e.g. for locking a differential of the transmission. The pressurized hydraulic fluid for the transmission brake releasing device may be derived from the pressurized hydraulic fluid supply available for use by the hydraulically operated or assisted steering mechanism and/or the hydraulic actuator of the machine transmission.

The pressurized hydraulic fluid supply for use by the hydraulically operated or assisted steering mechanism and/or the hydraulic actuator of the machine transmission may be provided by a system pump.

In a preferred arrangement, the transmission brake may be applied by a mechanical device such as a spring, so that in the absence of any available supply of pressurized hydraulic fluid and/or pressurized air, the transmission brake would be applied. However it is within the scope of the present invention for the transmission brake to be applied by hydraulic fluid pressure, as well as released by hydraulic fluid pressure by operation of the air operated transmission brake control valve.

Preferably the front and rear wheels of the ground engaging structure are driven wheels, there being a transmission member associated with each driven pair of wheels, and there being a transmission brake for each transmission member and there being a single transmission brake control valve to control the flow of hydraulic fluid to the brake releasing devices of both transmission brakes, to release the transmission brakes, by air pressure.

A modulating valve for modulating the hydraulic pressure applied to release the transmission brake when the brake control valve is actuated to permit the pressurized hydraulic fluid to flow therethrough may be provided upstream of the brake control valve.

The modulating valve may be operable progressively to restrict the pressure of the hydraulic fluid from the hydraulic system applied to release the transmission brake. The modulating valve may, like the brake control valve, be operated by air pressure derived from the air pressure system. Accordingly, the air pressure system may include an operator transmission brake control which an operator operates to permit pressurized air to pass via a supply line to the transmission brake control valve and the modulating valve.

The invention has particularly but not exclusively been developed for a working machine which is capable of road travel at high speeds by which we mean in excess of 25 miles per hour, and more particularly above 30 miles per hour, when the nature of the working machine and the high travel speeds will demand efficient braking.

The working machine may have a first working arm, usually at or towards a front of the machine, for performing loading operations, and a second working arm usually towards a rear of the machine, for performing excavating operations.

BRIEF DESCRIPTION OF THE DRAWINGS

Embodiments of the invention will now be described with the aid of the accompanying drawings in which:—

DESCRIPTION OF THE PREFERRED EMBODIMENTS

Figure 1:
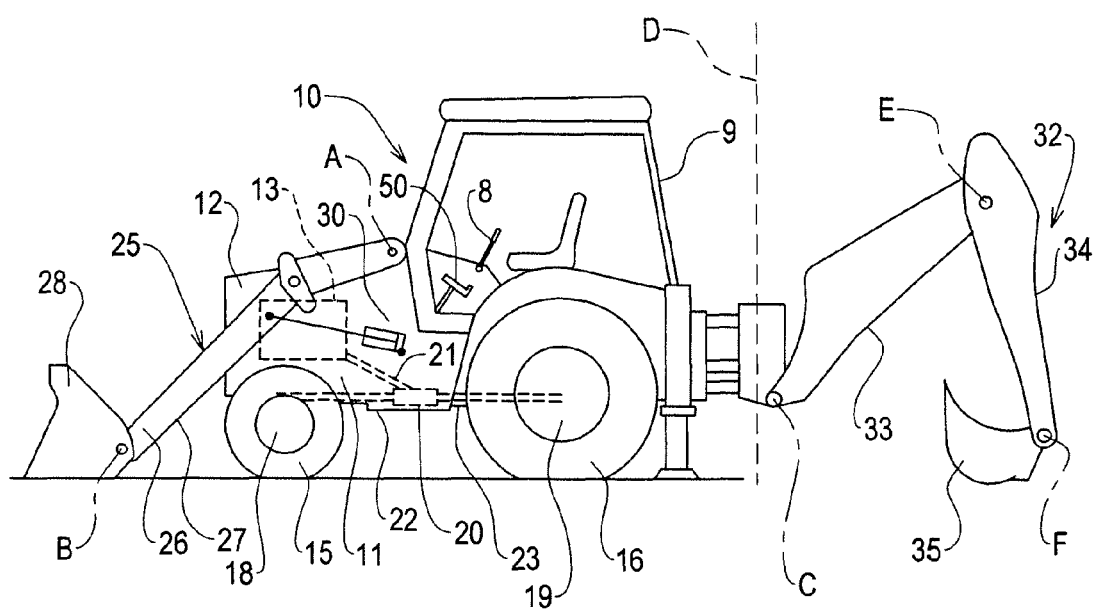
FIG. 1 is a side illustrative view of a working machine in accordance with the present invention.

Referring to the drawings there is shown a working machine 10 which includes a body 11 including a housing 12 for an engine 13 which provides power for the machine 10. The machine 10 further includes a ground engaging structure including a front pair of wheels 15 and a rear pair of wheels 16, the front pair of wheels 15 being carried on a front axle 18 and the rear pair of wheels 16 being carried on a rear axle 19.

Both pairs of wheels 15, 16 in this example are driven wheels, being driven by their respective axles 18, 19 from respective transmission members 22, 23 of a machine transmission 20 to which drive is provided from the engine 13 via drive shaft 21. As shown, the front wheels 15 are of smaller diameter than the rear wheels 16, but the wheels 15, 16 may be of the same diameter as required.

The machine 10 is a so-called backhoe loader, having at a front of the machine, a loader arm 25 provided by, in this example, a pair of arm elements 26, 27 which extend either side of the engine housing 12. The loader arm 25 is mounted on the body 11 at an inboard end, for pivotal up and down movement about a first generally horizontal axis A, under the control of one or a pair of hydraulically powered lifting actuators 30. The loader arm 25 carries at its outboard end, a loading implement which is a bucket 28 in this example, which is pivotal relative to the loader arm 25 about a second generally horizontal axis B, by a hydraulically operated actuator (not shown).

The machine 10 further includes at a rear end thereof, an excavating arm 32 which has a boom part 33 mounted on the body 11 for pivotal movement about both a third generally horizontal axis C and a generally upright axis D, and a dipper part 34 which is pivotal relative to the boom part 33 about a fifth generally horizontal axis E relative to the boom part 33. The boom 33 and dipper 34 parts of the excavating arm 32 are relatively pivotable by means of further hydraulic actuators (not shown), and the excavating arm 32 carries an excavating tool, in this case an excavating bucket 35 for excavating, which is pivotal relative to the dipper part 34 about another generally horizontal axis F by a hydraulic actuator.

Controls for operating the loading and excavating arms 25, 32 are operable from an operator's cab 9.

Pressurized hydraulic fluid for powering the various hydraulically powered services, e.g. hydraulic actuators 30 is provided by from a hydraulic system which includes a hydraulic pump 36 (see FIG. 2) driven directly from the engine 13, the pump 36 pumping fluid from a reservoir 37 to the hydraulic system, fluid flow to the various actuators 30 being controlled by one or more hydraulic control valves 40 which may be manually or electrically operated as required. Thus a supply of pressurized hydraulic fluid is always available while the engine 13 is running.

The machine 10 includes a second hydraulic pump 36b, in this example which is shown in dotted lines. The second hydraulic pump 36b, which may also be driven directly from the engine 13, is provided to supply pressurized hydraulic fluid to another hydraulic system which includes other machines 10 services 41, such as, for examples only, a hydraulically operated or assisted steering mechanism, and/ or one or more hydraulic actuators of the machine transmission, e.g. for locking a differential of the transmission, and if desired a pressurized hydraulic fluid supply for operating selected hand tools.

The working machine 10 further includes an air compressor 45 which may be driven from for example, an engine turbocharger, or otherwise from the engine 13 or from a motor. The air compressor 45 pressurizes air in a pressurized air system 46, and particularly charges a reservoir 48, the pressurized air being usable as hereinafter described, for applying service brakes of the machine 10.

The pressurized air is delivered to an air valve 49 which is actuated by a brake pedal 50 which is located in the operator's cab 9. The proportion of air which is permitted to pass the valve 49 depends upon the extent to which the foot pedal 50 is depressed and thus the air pressure downstream of the valve 49 is representative of a brake demand. The further the pedal 50 is depressed, up to its full extent of depression when substantially all the air delivered to the air valve 40 may pass therethrough to apply full braking pressure, the more pressurized air is provided to air-hydraulic actuators, one of which is indicated at 55, for applying service brakes.

The ground engaging structure provides for each wheel 15, 16 in this example, a braking device 56 for applying braking to the wheel 15, 16, each braking device 56 being operated to apply the brake by hydraulic fluid pressurized by an air-hydraulic actuator 55. Each air-hydraulic actuator 55 may be operative to supply pressurized hydraulic fluid to one or a plurality of braking devices 56.

In this example, each braking device 56 is a pad and disc type device including a rotatable member namely a disc 57, which rotates with the associated wheel 15, 16, and a braking member, i.e. a pad 58 (or pads) which is/are moveable into frictional engagement with the rotating disc 57 to effect braking, by hydraulic fluid acting for example through a "slave" piston and cylinder arrangement.

The air-hydraulic actuator 55 pressurizes hydraulic fluid which is separate from the hydraulic systems of the machine already described, from a brake fluid reservoir 62, by means of an air powered servo 61 mechanism such that the hydraulic fluid pressure developed, and accordingly the extent of braking, depends upon the air pressure delivered from the pedal operated air valve 49. Thus the further an operator depresses the brake pedal 50, the greater the braking force applied by the braking device 56 to its associated wheel 15, 16.

The service brakes 56 preferably are released by mechanical springs when air pressure is no longer supplied to the air-hydraulic actuators 55, i.e. when the brake pedal 50 is released. The foot pedal 50 too may be returned to its uppermost, unbraking position, by a mechanical spring, although in each case some other brake return/pedal release mechanism may be provided as required.

In accordance with the invention, the machine 10 further includes a transmission brake for applying primarily when the machine 10 is parked, and particularly when no supply of pressurized air for the service brakes 56, may be available.

In this example, the machine 10 is four wheel driven and accordingly to achieve adequate transmission braking, two such transmission brakes, indicated at 65, 66 are provided.

Each transmission brake 65, 66 in this example, includes a disc 67 each of which is carried by a respective transmission member 23 for the rear wheel 16 drive, and 22 for the front wheel 15 drive. Also there is provided for frictionally engaging each disc 67, a pad, or pads 68 in this example. The pads 68 are urged towards and into engagement with their respective discs 67, by mechanical springs 69, and hence in their rest conditions, the transmission brakes are applied to brake the discs 67 and hence the transmission members 22, 23.

However the transmission brakes 65, 66 are releasable by the application of pressurized hydraulic fluid to pressurized hydraulic fluid brake releasing devices 70, 71. By virtue of the transmission brake releasing devices 70, 71 being hydraulically releasable, notwithstanding that the springs 69 applying the brakes will be very strong springs in order to generate sufficient braking force to apply the transmission members 22, 23 adequately, the brake releasing devices 70, 71 may be made much smaller than comparable air operated units.

Figure 2:
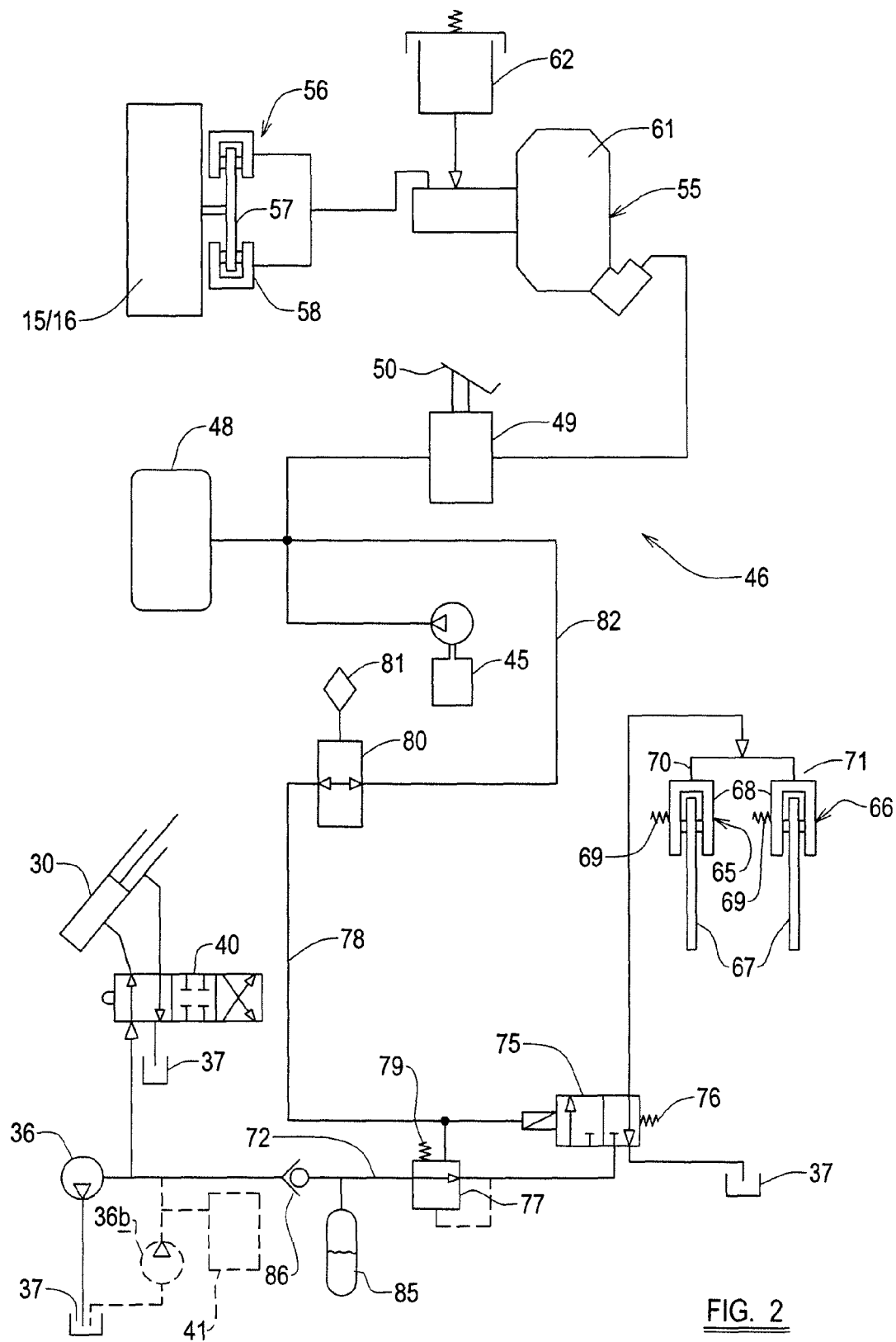
FIG. 2 is a schematic diagram of a braking system of the machine of FIG. 1.

The pressurized hydraulic fluid for releasing the transmission brakes 65, 66 is derived from the hydraulic system of the machine 10, via a fluid feed line indicated at 72, the hydraulic fluid passing through, in this example, a modulating valve 77, which is shown in an inactive condition in FIG. 2 and an on/off transmission brake control valve 75. The transmission brake control valve 75 is biased by a spring 76 towards a first operative condition as indicated in FIG. 2, in which the hydraulically operated brake releasing devices 70, 71 are each connected through the transmission brake control valve 75 to the reservoir 37 or another low pressure area, and so the devices 70, 71 will not act to release the transmission brakes 65, 66 which thus will be applied by the springs 69. In a second operative condition to which valve 75 is moveable against the spring 76, pressurized hydraulic fluid from the fluid feed line 72 may pass through the modulating valve 77, to the hydraulically operated brake releasing devices 70, 71 to release the brakes. 65, 66.

In accordance with the invention, the transmission brake control valve 75 is moveable to its second operative condition in which the transmission brakes 65, 66, may be released, depending on the condition of the modulating valve 77, only when pressurized air is provided to the control valve 75 along an air supply line indicated at 78, in response to operation of an operator transmission brake control 80 from within the cab 9. Desirably the transmission brake control 80 is hand operated by an operator actuating an operating lever 81, and is capable of varying the air pressure passing to the air supply line 78.

Desirably, when the transmission brake control 80 is in a closed condition, no pressurized air passes to air supply line 78 downstream of the brake control 80, and the brake control valve 75 remains in its first operating condition shown in FIG. 2 due to the action of its spring 76, but when the transmission brake control 80 is opened, a minimum flow of pressurized air is allowed to the air supply line 78, sufficient to move the brake control valve 75 against the force of its spring 76, to its second operative condition.

However, the air pressure above the minimum may be controllably, e.g. incrementally, increased and decreased, for a purpose hereinafter described.

In this example, pressurized air for releasing the transmission brakes 65, 66 is derived from the air system 46 provided for applying the service brakes 56. Thus pressurized air may be delivered from the air system 46 along a line 82 to the transmission brake control valve 75. At least a minimum air pressure, e.g. 4 bar, may be required to move the brake control valve 75 against the force of its spring 76.

It will be appreciated that in the event of a failure in the air system, or when the pressure in the air system 46 deliberately is released, e.g. when it desired to park the machine 10 for long periods, no pressurized air will be available to move the transmission brake control valve 75 against its spring 76 to its second operative condition and thus the transmission brakes 65, 66 will remain or be applied. This provides for a fail safe feature in that braking from the transmission brakes 65, 66 will always be available.

Similarly in the event of any failure of the hydraulic pump 36 or 36b, there will be no or insufficiently pressurized hydraulic fluid available actually to release the transmission brakes 65, 66. Thus the use of the pressurized air actuated transmission brake control valve 75 results in the transmission brakes 65, 66 being applied in the event of either of both air system 45 or hydraulic pressure failures.

It is a desirable feature for the transmission brakes 65, 66 to be available for use to provide partial braking only, so that the transmission brake 65, 66 may partially only be applied to give some braking resistance to the machine 10 movement, e.g. when the machine is on a slope, whilst full braking of the machine 10 may be achieved by the operator applying the service brakes 56 using the foot pedal 50.

To achieve this functionality, the modulating valve 77 may be progressively closable to restrict the pressure of the hydraulic fluid which is applied to release the transmission brakes 65, 66. Thus the extent to which the transmission brakes 65, 66 can be released, is controlled by the extent of opening of the modulating valve 77.

It will be appreciated that the modulating valve 77 is only illustrated diagrammatically. The extent of opening of the modulating valve 77 is controlled on the one hand by a spring 79 which tends to maintain the modulating valve 77 in its inactive condition as shown, and on the other hand by pressurized air from the pressurized air supply line 78. The pressurized air may be provided to the modulating valve 77, proportionally to close the modulating valve 77, depending upon the position of the operating lever 81 of the transmission brake operator control 80.

The modulating valve 77 is upstream of the brake control valve 75 between the brake control valve 75 and the hydraulic system from where the pressurized hydraulic fluid to release the transmission brake 65, 66 is derived.

Upstream of the modulating valve 77, a pressurized hydraulic fluid reservoir 85 may be provided, and a further upstream non-return valve 86. These are provided so that hydraulic fluid pressure sufficient for the proper operation of the modulating valve 77 and for releasing the transmission brake 65, 66 when sufficiently pressurized hydraulic fluid may not otherwise be available from the pumped system, is retained in the hydraulic fluid supply line 72.

Various modifications are possible without departing from the scope of the present invention.

Although the invention has been described with particular reference to a working machine 10 which is a backhoe loader, the invention may be applied to other working machine types. Thus the description of a particular machine configuration is only exemplary.

In another example, a single transmission brake 65, 66 may be provided, particularly where the machine 10 is only a two driven wheel machine.

In another example the transmission brakes 65, 66 need not be of the disc and pad type, but the invention may be applied to another kind of friction brake, such as drum and caliper, where the transmission member 22, 23 may carry a drum, or further alternatively, the transmission brake or brakes 65, 66 may each be a multi-interleaved plate type brake.

The air system 46 described is only exemplary and many other configurations are possible. The provision of the modulating valve 77 is optional, and where provided, the modulating valve 77 need not be closed by air pressure from the pressurized air system 46, but by any other means such as for example only, an electrically operated means. Where the modulating valve 77 is not provided, the transmission brake operator control 80, could be a simple on/off valve rather than being able to deliver varying air pressure to the air supply line 78.

As shown and described, the pressurized hydraulic fluid for releasing the fluid transmission brakes 65, 66 may be derived from each of the two hydraulic systems of the machine, each of which includes a pump 36 or 36b, such that there is an integrated hydraulic circuit. However, the two pumps 36, 36b may provide pressurized hydraulic fluid to completely separate hydraulic systems with the supply of pressurized hydraulic fluid for releasing the transmission brakes 65, 66, being derived only from one hydraulic system which includes the first pump 36 or the second pump 36b, and associated services.

In another example, the machine 10 may only include a single hydraulic pumped system.

It is within the scope of the present invention for the pressurized hydraulic fluid for releasing the transmission brake control valve 75 to be derived from other than the hydraulic system of the machine 10 which includes actuator 30 and control valve 40 for operating the working arm or arms 25, 32 of the machine, for example from a dedicated pressurized hydraulic fluid supply.

It is within the scope of the present invention for the transmission brake or brakes 65, 66 to be applied by hydraulic fluid pressure, as well as released by hydraulic fluid pressure by operation of the air actuated transmission brake control valve 75.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A working machine including a body, a ground engaging structure including at least one pair of driven wheels, an engine, and a transmission for transmitting power from the engine to the driven wheels, a pressurised air system for providing pressurised air for use in applying service brakes for braking the wheels, the transmission including a transmission member which is rotatable with the wheels, a transmission brake for applying a braking force to the transmission member, and the transmission brake being releasable by a hydraulic fluid operated transmission brake releasing device, the hydraulic fluid for the brake releasing device being derived from a pressurised hydraulic fluid system which includes a hydraulic pump and one or more pressurised hydraulic fluid operated services, there being a transmission brake control valve to control the flow of hydraulic fluid to the brake releasing device, the transmission brake control valve being actuated to permit pressurised hydraulic fluid to flow therethrough to release the transmission brake, by air pressure derived from the pressurised air system.

2. A machine according to claim 1 in which the ground engaging structure includes for each driven wheel, a braking device for applying braking to the wheel, each braking device being operated to apply the brake by hydraulic fluid pressurised by an air-hydraulic actuator separate from the pressurised hydraulic fluid system from which pressurised hydraulic fluid is derived for the transmission brake releasing device.

3. A machine according to claim 2 wherein a supply of pressurised air for applying to the transmission brake control valve to control the flow of hydraulic fluid to the brake releasing device, is derived from an air system which includes the air-hydraulic actuator.

4. A machine according to claim 1 wherein the machine includes a plurality of pressurised hydraulic fluid actuated services, the pressurised hydraulic fluid being provided by the hydraulic pump, pressurised hydraulic fluid for the transmission of brake releasing device being derived from the hydraulic system of the machine which includes the hydraulic pump and one or more of the services.

5. A machine according to claim 4 wherein the machine has a working arm for performing a working operation, the working arm being powered by at least one hydraulic actuator, the hydraulic fluid for the transmission brake releasing device being derived from the pressurised hydraulic fluid supply available for operating the hydraulic actuator.

6. A machine according to claim 5 wherein the working arm is operated by said at least one hydraulic actuator, the at least one hydraulic actuator being provided with pressurised hydraulic fluid by the hydraulic pump.

7. A machine according to claim 4 wherein the machine includes a hydraulically operated or assisted steering mechanism and/or one or more hydraulic actuators of the machine transmission, the pressurised hydraulic fluid for the transmission brake releasing device being derived from the pressurised hydraulic fluid supply available for use by the hydraulically operated or assisted steering mechanism and/or the hydraulic actuator of the machine transmission.

8. A machine according to claim 7 wherein the pressurised hydraulic fluid for use by the hydraulically operated or assisted steering mechanism and/or the hydraulic actuator for the machine transmission, is provided by the hydraulic pump.

9. A machine according to claim 1 wherein the transmission brake is applied by a mechanical device.

10. A machine according to claim 1 wherein the front and rear wheels of the ground engaging structure are driven wheels, there being a transmission member associated with each driven pair of wheels, and there being a transmission brake for each transmission member and there being the transmission brake control valve to control the flow of hydraulic fluid to the brake releasing devices of both transmission brakes, to release the transmission brakes, by air pressure.

11. A machine according to claim 10 wherein there is provided upstream of the brake control valve, a modulating valve for modulating the hydraulic pressure applied to release each transmission brake.

12. A machine according to claim 11 wherein the modulating valve is operable progressively to restrict the pressure of the hydraulic fluid from the hydraulic system applied to release the transmission brake.

13. A machine according to claim 12 wherein the modulating valve is operated by air pressure derived from the air pressure system.

14. A machine according to claim 13 wherein the air pressure system includes an operator transmission brake control which an operator operates to permit pressurised air to pass via a supply line to the transmission brake control valve and the modulating valve.

15. A machine according to claim 1 in which the front and rear wheels are all ostensibly of the same diameter, and the working machine is capable of road travel at speeds in excess of 25 miles per hour.

16. A working machine according to claim 1 which has a first working arm at or towards a front of the machine, for performing loading operations and a second working arm towards a rear of the machine, for performing excavating operations.

17. A machine according to claim 15 in which the machine is capable of road travel at speeds in excess of 30 miles per hour.

* * * * *